Patented Aug. 24, 1926.

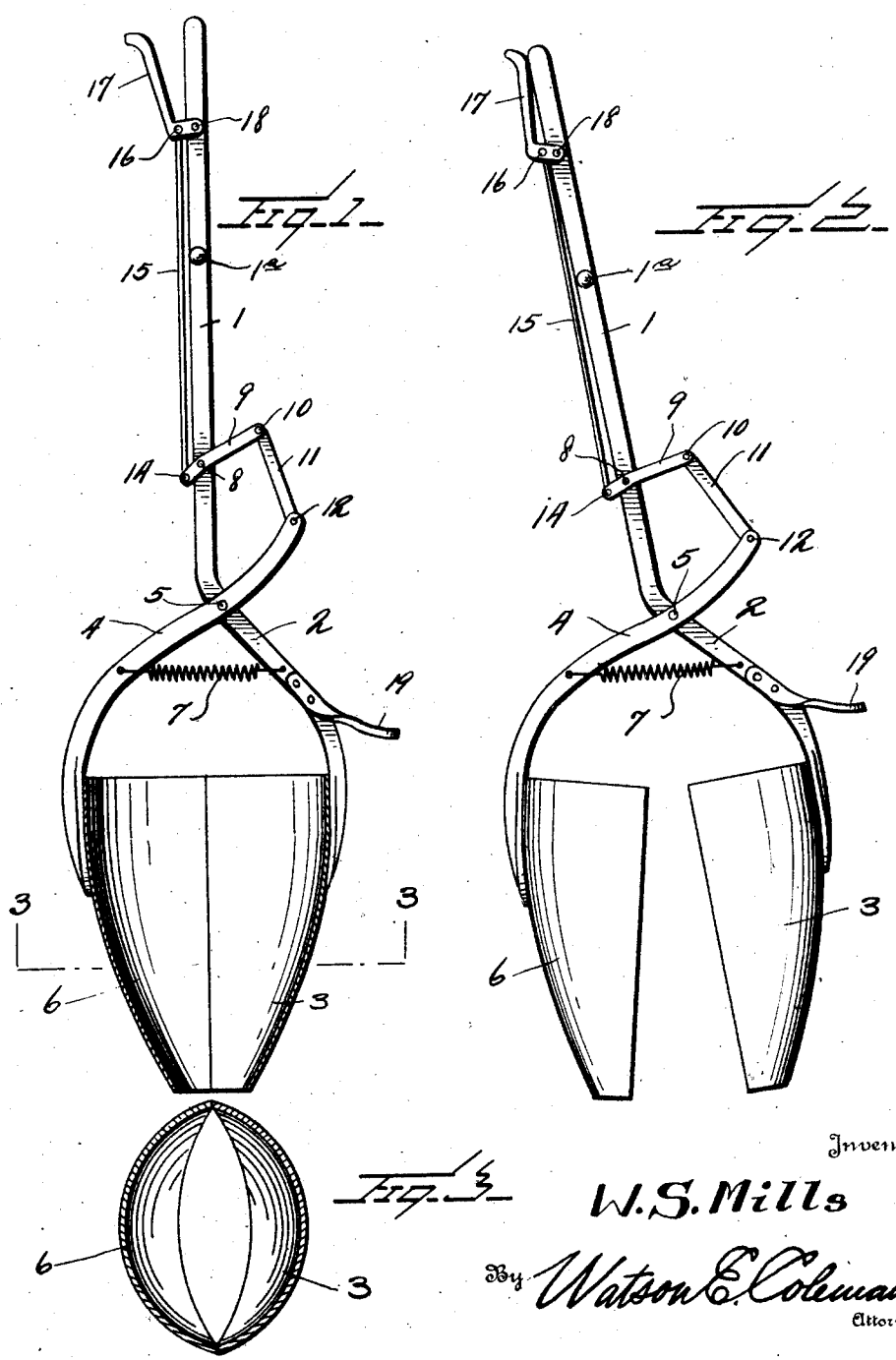

1,597,281

UNITED STATES PATENT OFFICE.

WILLIAM S. MILLS, OF FLORENCE, SOUTH CAROLINA.

TRANSPLANTER.

Application filed March 30, 1926. Serial No. 98,573.

This invention relates to certain improvements in transplanters and it is an object of the invention to provide a device of this kind which can be readily employed with the operator at all times in substantially an upright position.

It is also an object of the invention to provide a device of this character constructed in a manner permitting it to be employed to advantage to transplant small plants from one part of a field to another and in a manner whereby soil immediately surrounding the plant is not disturbed and the roots therein are not disturbed and thereby obviating wilting of the plant when transplanting.

The invention consists in the details of construction and in the combination and arrangement of the several parts of my improved transplanter whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view partly in elevation and partly in section of a transplanter constructed in accordance with an embodiment of my invention;

Figure 2 is a view in side elevation of the device as herein disclosed and substantially in position for penetration into the soil;

Figure 3 is a sectional view taken substantially on the line 3—3 of Figure 2.

As disclosed in the accompanying drawing, 1 denotes an elongated handle member provided at one end with a laterally curved extension 2 which is suitably anchored to the end portion of a cup like blade 3. This blade 3 is relatively large at its upper or connected end portion and is gradually reduced toward its opposite or lower end.

Crossing the extension 2 at a point in relatively close proximity to its junction with the handle member 1 is a lever 4 disposed on a compound curve or substantially sigmoidal in form. The overlying portions of the extension 2 and the lever 4 are pivotally connected for relative swinging movement through the medium of a rivet 5 or the like. The outer or lower end portion of the lever 4 is secured to a cup like blade 6 substantially in duplicate of the plate 3 hereinbefore referred to. The extension 2 and the lever 4 outwardly or below the pivotal connection 5 are tied or connected by a retractile member 7. This member 7 preferably comprises a coil spring and possesses sufficient strength to constantly urge the blades 3 and 6 one toward the other.

The handle member 1 has pivotally connected thereto, as at 8, at a predetermined point above the pivotal connection 5 a second lever 9. This lever 9 extends beyond opposite sides of the handle member 1 and to a greater extent beyond one side than the other. The outer end portion of the long leg of the lever 9 has pivotally connected therewith, as at 10, a rigid link 11 which is also pivotally connected, as at 12, to the upper or adjacent end portion of the lever 4.

The shorter leg of the lever 9 has pivotally connected, as at 14, with its outer extremity an end portion of a rod 15. This rod extends along the handle member 1 and is pivotally connected, as at 16, with a latch lever 17 pivotally connected, as at 18, with the upper or outer end portion of the handle member 1.

When the latch lever 17 is pulled in toward the handle member 1, the lever 9 through the instrumentality of the link 10 will swing the lever 4 in a direction to separate the blades 3 and 6 as illustrated in Figure 2.

In practice, the blades 3 and 6 are first separated as shown in Figure 2 with the handle member 1 disposed on an upward incline in a direction away from the operator and with the blade 3 in substantially a vertical position. The plant to be transplanted is, of course, located between the separated blades 3 and 6 which are forced into the soil by pressure of the foot upon the foot piece or pedal 19 secured to and extending outwardly from the central portion of the extension 2. After the blades 3 and 6 have been forced to proper extent within the soil, the handle member 1 is pulled toward the operator and which movement causes the blade 3 to serve somewhat after the fashion of a scoop to lift the plant out of the ground and during which lifting operation the blade 3 incident to gravity and under the influence of the member or spring 7 is caused to effectively bear against the soil arranged between the blades 3 and 6 so that when the plant is entirely lifted out of the soil it is effectively retained between such blades.

When the plant is entirely lifted, the blades 3 and 6 are in closed relation as illustrated in Figure 1, and under which condition the latch lever 17 is swung to an outward position with respect to the handle member 1. When the blades 3 and 6 together with the plant held therebetween are inserted in the proper hole, pull upon the latch lever 17 will cause the blades 3 and 6 to separate permitting the plant to be readily dropped within such hole. With my improved transplanter the plant is taken from the ground without disturbing the soil around the roots and with but little, if any, disturbance of the roots. This is of particular importance as when the plant has been transplanted the liability of wilting is substantially eliminated.

The handle member 1 at a desired point thereon is provided with an outstanding hand grasp or knob 1ª to provide means whereby the device may be handled with added convenience. This hand grasp or knob is preferably disposed substantially at right angles to the latch lever 17.

From the foregoing description it is thought to be obvious that a transplanter constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A transplanter comprising, in combination, an elongated handle member provided at one end with a lateral extension, a lever pivotally connected to said extension and extending beyond opposite sides thereof, cup like blades carried by the outer extremities of the extension and of the lever, a second lever pivotally connected with the handle member, a link operatively connecting one end portion of the second named lever and the opposite end portion of the first named lever, a latch lever pivotally engaged with the handle member, and a rod operatively connecting the latch lever and the opposite end portion of the second named lever.

2. A transplanter comprising, in combination, an elongated handle member provided at one end with a lateral extension, a lever pivotally connected to said extension and extending beyond opposite sides thereof, cup like blades carried by the outer extremities of the extension and of the lever, a second lever pivotally conncted with the handle member, a link operatively connecting one end portion of the second named lever and the opposite end portion of the first named lever, a latch lever pivotally engaged with the handle member, a rod operatively connecting the latch lever and the opposite end portion of the second named lever, and a retractile member interposed between and connecting the extension of the handle member and the first named lever.

In testimony whereof I hereunto affix my signature.

WILLIAM S. MILLS.